(12) United States Patent
Paick

(10) Patent No.: US 9,205,889 B2
(45) Date of Patent: Dec. 8, 2015

(54) FOLDABLE ELECTRIC BICYCLE AND CONTROL METHOD THEREOF

(71) Applicant: MANDO CORPORATION, Pyeongtaek-si (KR)

(72) Inventor: In Ha Paick, Gangnam-gu (KR)

(73) Assignee: MANDO CORPORATION, Gyeonggi-Do (KR)

( * ) Notice: Subject to any disclaimer, the term of this patent is extended or adjusted under 35 U.S.C. 154(b) by 69 days.

(21) Appl. No.: 14/109,903

(22) Filed: Dec. 17, 2013

(65) Prior Publication Data

US 2015/0060176 A1    Mar. 5, 2015

(30) Foreign Application Priority Data

Aug. 27, 2013 (KR) .................. 10-2013-0101559

(51) Int. Cl.
| | | |
|---|---|---|
| *B62K 15/00* | (2006.01) | |
| *B62M 6/60* | (2010.01) | |
| *B62M 6/45* | (2010.01) | |
| *B62K 25/00* | (2006.01) | |

(52) U.S. Cl.
CPC ............... *B62K 15/006* (2013.01); *B62M 6/45* (2013.01); *B62M 6/60* (2013.01); *B62K 25/005* (2013.01)

(58) Field of Classification Search
CPC .... B62K 15/00; B62K 15/006; B62K 15/008; B62M 6/45; B62M 6/60
USPC .......................................... 108/208, 219, 220
See application file for complete search history.

(56) References Cited

U.S. PATENT DOCUMENTS

| 6,739,421 | B1 * | 5/2004 | Miya ............................. 180/220 |
| 2003/0047363 | A1 * | 3/2003 | Makuta et al. ............... 180/65.5 |
| 2003/0075372 | A1 * | 4/2003 | Kurohori et al. ............. 180/219 |
| 2006/0266570 | A1 * | 11/2006 | Roth et al. .................... 180/208 |
| 2009/0115167 | A1 | 5/2009 | Chin et al. |
| 2012/0043148 | A1 * | 2/2012 | Brady et al. ............... 180/206.5 |
| 2012/0273287 | A1 * | 11/2012 | Song .......................... 180/65.31 |

(Continued)

FOREIGN PATENT DOCUMENTS

| CN | 201 660 071 U | 12/2010 |
| EP | 1 582 451 | 10/2005 |

(Continued)

OTHER PUBLICATIONS

Extended European Search Report dated Jan. 19, 2015 for European Patent Appl. No. 13196833.1.

(Continued)

*Primary Examiner* — James English
(74) *Attorney, Agent, or Firm* — Ladas & Parry, LLP

(57) ABSTRACT

Disclosed herein are a foldable electric bicycle and a control method thereof. The foldable electric bicycle including a drive motor to rotate at least one of a front wheel and a rear wheel, and an actuation lever to lock or unlock rotation between a front frame provided with the front wheel and a rear frame provided with the rear wheel by shifting the actuation lever, includes an actuation lever sensing unit to sense whether the actuation lever is at a locked position or at an unlocked position, a motor driving unit to drive the drive motor, and a control unit which controls the motor driving unit to drive the drive motor in order to generate torque between the front frame and the rear frame by movement of the wheels when the actuation lever is shifted from the locked position to the unlocked position.

18 Claims, 12 Drawing Sheets

(a)

(b)

(56) References Cited

U.S. PATENT DOCUMENTS

| | | | |
|---|---|---|---|
| 2014/0077474 A1* | 3/2014 | Priest et al. | 280/278 |
| 2014/0080661 A1* | 3/2014 | Paick et al. | 477/3 |
| 2014/0081494 A1* | 3/2014 | Chun et al. | 701/22 |
| 2014/0081496 A1* | 3/2014 | Chun et al. | 701/22 |
| 2015/0066267 A1* | 3/2015 | Chun | 701/22 |

FOREIGN PATENT DOCUMENTS

| | | |
|---|---|---|
| JP | 2003-072654 | 3/2003 |
| JP | 2003-081169 | 3/2003 |
| WO | 02/36419 | 5/2002 |

OTHER PUBLICATIONS

Office Action dated Dec. 28, 2014 for Korean Patent Application No. 10-2013-0101559 and its English machine translation by Google Translate.

* cited by examiner (a)

(b)

FOLDABLE ELECTRIC BICYCLE AND CONTROL METHOD THEREOF

CROSS-REFERENCE TO RELATED APPLICATION

This application claims the benefit of Korean Patent Application No. 2013-0101559, filed on Aug. 27, 2013 in the Korean Intellectual Property Office, the disclosure of which is incorporated in its entirety herein by reference.

BACKGROUND

1. Field

Embodiments of the present invention relate to a foldable electric bicycle capable of being folded for convenience of storage and transportation thereof, and a control method thereof.

2. Description of the Related Art

In general, an electric bicycle includes a frame constituting the bicycle, wheels mounted to the frame, a drive motor to rotate the wheels, and a battery to supply power to the drive motor. The electric bicycle runs in a manner of rotating the wheels by the drive motor.

The drive motor rotates when a user turns a throttle which is an acceleration means located at a handle, and the wheels turn by rotation of the drive motor such that the electric bicycle moves forward.

Since the existing electric bicycle has an integrally formed frame, storage and transportation thereof are inconvenient.

In recent years, a foldable electric bicycle having a structure in which a front frame and a rear frame rotate about a center frame to be foldable has been developed. In such a foldable electric bicycle, a locking pin, which passes through the front frame, the center frame, and the rear frame, is unlocked by only operation of an actuation lever in a state of allowing a user to grip the center frame, so that the front frame and the rear frame rotate about the center frame to be folded. In more detail, when a user lightly lifts the center frame after unlocking the locking pin by operation of the actuation lever, a front wheel joined to the front frame a rear wheel joined to the rear frame are rolled to be gathered toward the center frame such that the front frame and the rear frame are folded about the center frame.

However, since a predetermined force or more is required for the existing foldable electric bicycle when the front frame and the rear frame are folded about the center frame, the elderly and infirm or the women may be cumbersome and difficult in folding the electric bicycle.

SUMMARY

Therefore, it is an aspect of the present invention to provide a foldable electric bicycle and a control method thereof capable of actuating a wheel rotated by a drive motor among wheels joined to a front frame and a rear frame when an electric bicycle is folded, in order to simply and easily fold the electric bicycle.

It is another aspect of the present invention to provide a foldable electric bicycle and a control method thereof capable of actuating a wheel rotated by a drive motor when a folded electric bicycle is moved, in order to conveniently move and transport the folded electric bicycle.

Additional aspects of the invention will be set forth in part in the description which follows and, in part, will be obvious from the description, or may be learned by practice of the invention.

In accordance with one aspect of the present invention, a foldable electric bicycle including a drive motor to rotate at least one of a front wheel and a rear wheel, and an actuation lever to lock or unlock rotation between a front frame provided with the front wheel and a rear frame provided with the rear wheel by shifting the actuation lever so as to fold the electric bicycle or maintain a folded state or an unfolded state of the electric bicycle, includes an actuation lever sensing unit to sense whether the actuation lever is at a locked position in which the rotation between the front frame and the rear frame is locked or at an unlocked position in which the rotation between the front frame and the rear frame is unlocked, a motor driving unit to drive the drive motor, and a control unit which controls the motor driving unit to drive the drive motor in order to generate torque between the front frame and the rear frame by movement of the wheels when a position of the actuation lever is sensed by the actuation lever sensing unit and the sensed actuation lever is shifted from the locked position to the unlocked position.

The foldable electric bicycle may further include a throttle opening degree sensing unit which senses an opening degree of a throttle to accelerate the foldable electric bicycle, and the control unit may control the motor driving unit to drive the drive motor when the actuation lever sensed by the actuation lever sensing unit is shifted from the locked position to the unlocked position and the throttle opening degree sensed by the throttle opening degree sensing unit is changed.

The control unit may allow the drive motor to be driven at a preset speed by the motor driving unit so as to be slower than a normal driving speed.

The normal driving speed may be a motor speed to drive the drive motor when the actuation lever is at the locked position and the throttle opening degree is changed.

The control unit may allow the drive motor to be driven at the normal driving speed changed from the preset speed when the actuation lever sensed by the actuation lever sensing unit is shifted from the unlocked position to the locked position and the throttle opening degree sensed by the throttle opening degree sensing unit is changed.

The control unit may allow the drive motor to be driven at a speed corresponding to a change in throttle opening degree sensed by the throttle opening degree sensing unit.

The control unit may control the motor driving unit to drive the drive motor for a preset time.

The control unit may control the motor driving unit to drive the drive motor in order to move a folded electric bicycle when the actuation lever sensed by the actuation lever sensing unit is shifted from the unlocked position to the locked position and a throttle opening degree sensed by a throttle opening degree sensing unit is changed.

The drive motor may be provided in the rear wheel to rotate the rear wheel.

In accordance with another aspect of the present invention, a method of controlling a foldable electric bicycle including a drive motor to rotate at least one of a front wheel and a rear wheel, and an actuation lever to lock or unlock rotation between a front frame provided with the front wheel and a rear frame provided with the rear wheel by shifting the actuation lever so as to fold the electric bicycle or maintain a folded state or an unfolded state of the electric bicycle, includes sensing whether the actuation lever is at a locked position in which the rotation between the front frame and the rear frame is locked or at an unlocked position in which the rotation between the front frame and the rear frame is unlocked, and driving the drive motor in order to generate torque between the front frame and the rear frame by movement of the wheels when the sensed actuation lever is shifted from the locked position to the unlocked position.

An opening degree of a throttle to accelerate the foldable electric bicycle may be sensed when the sensed actuation lever is shifted from the locked position to the unlocked position, and the drive motor may be driven to move a folded electric bicycle when the sensed throttle opening degree is changed.

The drive motor may be driven at a preset speed so as to be slower than a normal driving speed.

The normal driving speed may be a motor speed to drive the drive motor when the actuation lever is at the locked position and the throttle opening degree is changed.

The drive motor may be driven at the normal driving speed changed from the preset speed when the sensed actuation lever is shifted from the unlocked position to the locked position and the sensed throttle opening degree is changed.

The drive motor may be driven at a speed corresponding to a change of the sensed throttle opening degree.

The drive motor may be driven for a preset time.

The drive motor may be driven to move a folded electric bicycle when the sensed actuation lever is shifted from the unlocked position to the locked position and a sensed throttle opening degree is changed.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
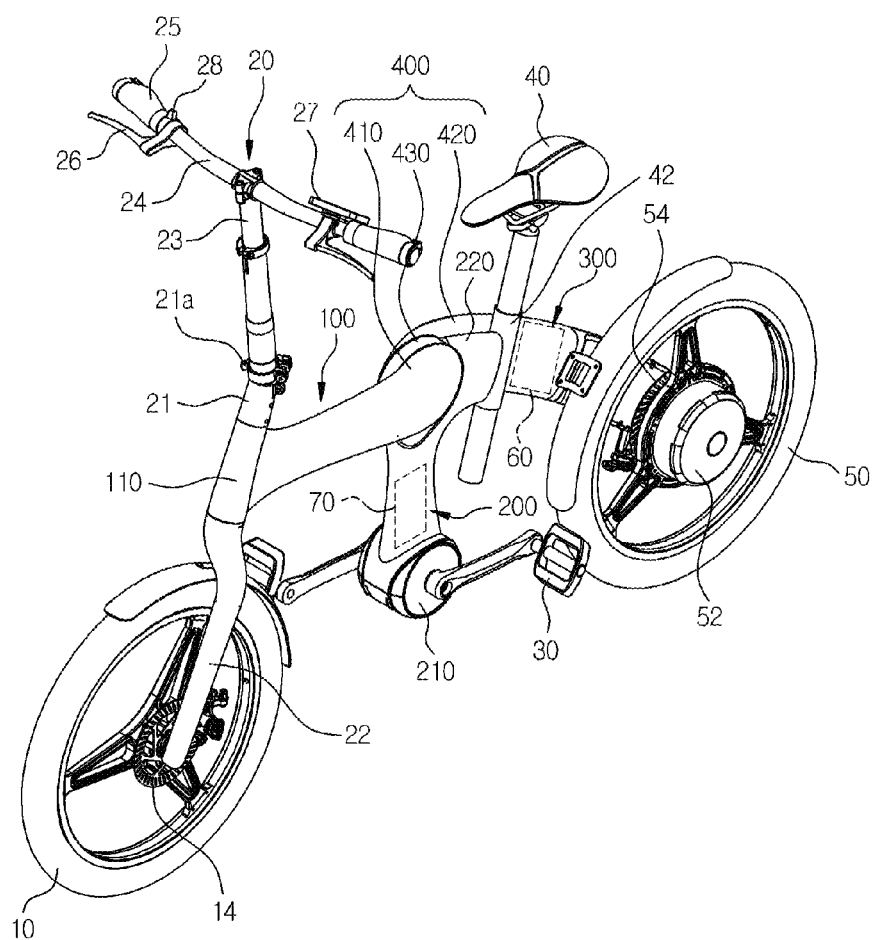
FIG. 1 is a perspective view illustrating an unfolded state of a foldable electric bicycle according to an embodiment of the present invention.

Reference will now be made in detail to the embodiments of the present invention with reference to the accompanying drawings. These embodiments are provided as examples so that the present invention will be thorough and complete, and will fully convey the scope of the invention to those skilled in the art. The present invention may be embodied in many different forms and should not be construed as limited to the embodiments set forth herein. In certain embodiments, unrelated portions may be omitted in the drawings in order to avoid obscuring appreciation of the invention by a person of ordinary skill in the art. In the drawings, the width, the length, the thickness, or the like of each component may be exaggerated, omitted, or schematically illustrated for convenience of description and clarity. Wherever possible, the same reference numbers will be used throughout the drawings to refer to the same or like parts.

In the specification, the term "and/or" means to include at least one of preceding and succeeding components. In addition, the term "connected/coupled" means that one component is directly connected to another component or is indirectly connected through another component. In the specification, the singular forms are intended to include the plural forms as well, unless context clearly indicates otherwise. It will be further understood that the terms "comprises" and/or "comprising," when used in the specification, specify the presence of stated features, integers, steps, operations, elements, and/or components, but do not preclude the presence or addition of one or more other features, integers, steps, operations, elements, components, and/or groups thereof.

Figure 2:
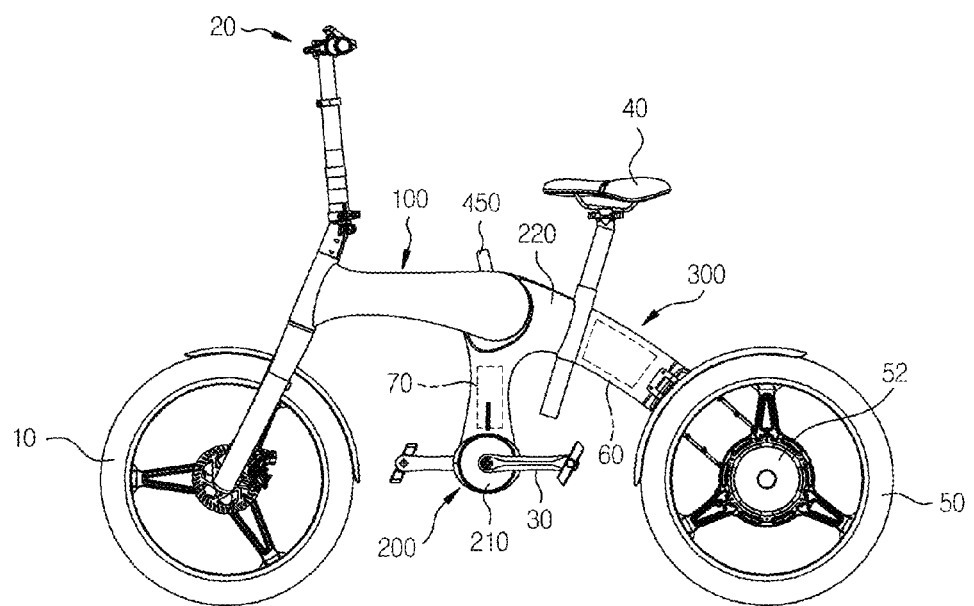
FIG. 2 is a side view of the foldable electric bicycle according to the embodiment of the present invention.

FIG. 1 is a perspective view illustrating an unfolded state of a foldable electric bicycle according to an embodiment of the present invention. FIG. 2 is a side view of the foldable electric bicycle according to the embodiment of the present invention.

Referring to FIGS. 1 and 2, an electric bicycle, for example a chainless electric bicycle includes a front frame 100 provided with a front wheel 10 and a handle portion 20, a center frame 200 provided with pedals 30 and a saddle 40, and a rear frame 300 provided with a rear wheel 50. The respective frames 100, 200, and 300 are rotatably coupled to each other by a hinge-coupling portion 400.

The front frame 100 has an inner space and is formed in a bar shape. The front frame 100 is provided, at one end thereof, with a handlebar 110 and is provided, at the other end thereof, with a front hinge-coupling portion 410, thereby being rotatably coupled to the center frame 200.

The handlebar 110 has a hollow shape and is rotatably coupled with a handle stem 21. The handle stem 21 may include a front wheel fixing frame 22 beneath the handlebar 110 and a handle fixing frame 23 above the same. The handle stem 21 is folded toward the front wheel 10 by a clamp 21a.

The front wheel fixing frame 22 is provided by partially bending the handle stem 21 in a lateral direction from a center thereof such that the front wheel 10 is flush with the rear wheel 50. The handle fixing frame 23 supports a center of a handle bar 24. In order to be easily steered by a user, both ends of the handle bar 24 are provided with respective handle grips 25 and respective brake levers 26 to brake the front and rear wheels 10 and 50.

The handle bar 24 is detachably provided, at one side thereof, with a display device 27 which displays information such as a change in speed of the electric bicycle and an amount of a battery and is provided, at the other side thereof, with a throttle 28 for acceleration and transmission. The throttle 28 may be a lever form operable by a user and output a signal indicative of how level the throttle 28 is rotated depending upon rotation operation by a user. The throttle 28 may sense an opening degree of a throttle valve provided therein and output a signal corresponding thereto, similarly to a typical throttle.

The center frame 200 has an inner space and is formed in a bar shape. The center frame 200 is provided, at one end thereof, with the pedals 30 and is provided, at the other end thereof, with a center hinge-coupling portion 430 such that the front frame 100 and the rear frame 300 are rotatably coupled to each other at both sides of the center hinge-coupling portion 430. The pair of pedals 30 rotates about a pedal coupling portion 210 provided at the center frame 200.

The pedal coupling portion 210 is provided therein with a generator such that torque of the pedals 30 is converted into electric energy and the converted electric energy charges a battery 60 which is electrically connected to the generator. The inner space of the center frame 200 is provided with a control unit 70 for electric connection and control between all electrical components including the generator and the battery. Since each of the frames 100, 200, and 300 has the accommodation space therein, the control unit 70 may be installed to the other frames 100 and 300 besides the center frame 200.

In addition, the center frame 200 may include a saddle frame 220 so as to be capable of installing the saddle 40.

The saddle frame 220 is provided, at the rear thereof, with a saddle tube 42 so as to be capable of installing the saddle 40, and the saddle tube 42 is coupled to a saddle rod 43 which enables adjustment of the height of the saddle 40. The saddle frame 220 may be formed integrally with from the center frame 200 or may be assembled with the center frame 200 by welding or bolting after being formed separately therefrom.

The rear frame 300 has an inner space and is formed in a bar shape. The rear frame 300 is rotatably provided, at one end thereof, with the rear wheel 50 and is provided, at the other end thereof, with a rear hinge-coupling portion 420 so as to be rotatably coupled to the center frame 200.

The inner space of the rear frame 300 may be provided with the battery 60, a BMS (Battery Management System), and the like. These are electrically connected to the control unit 70 provided in the center frame 200. The rear wheel 50 includes a drive motor 52, and the drive motor 52 is supplied with power from the battery 60 to rotate the rear wheel 50. Since each of the frames 100, 200, and 300 has the accommodation space therein, the battery 60 may be installed to the other frames 100 and 200 besides the rear frame 300.

Here, although the front wheel 10 and the rear wheel 50 are not described in detail, the wheels 10 and 50 may includes respective discs 14 and 54 and respective friction pads which serve as a braking member such that torque may be limited during operation of the brake levers 26.

Hereinafter, a description will be given in detail of the hinge-coupling portion 400 which rotatably couples the front frame 100, the center frame 200, and the rear frame 300.

Figure 3:
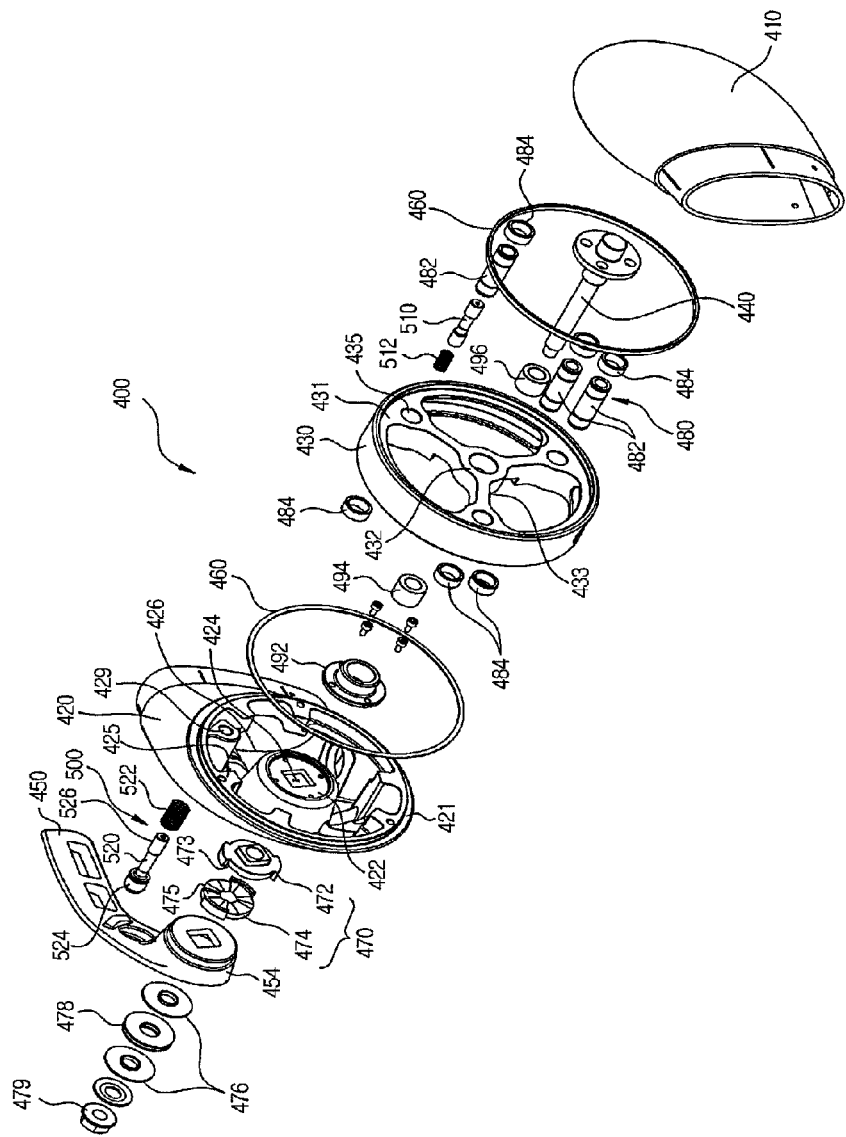
FIG. 3 is an exploded perspective view illustrating a hinge-coupling portion of the electric bicycle according to the embodiment of the present invention.
Figure 4:
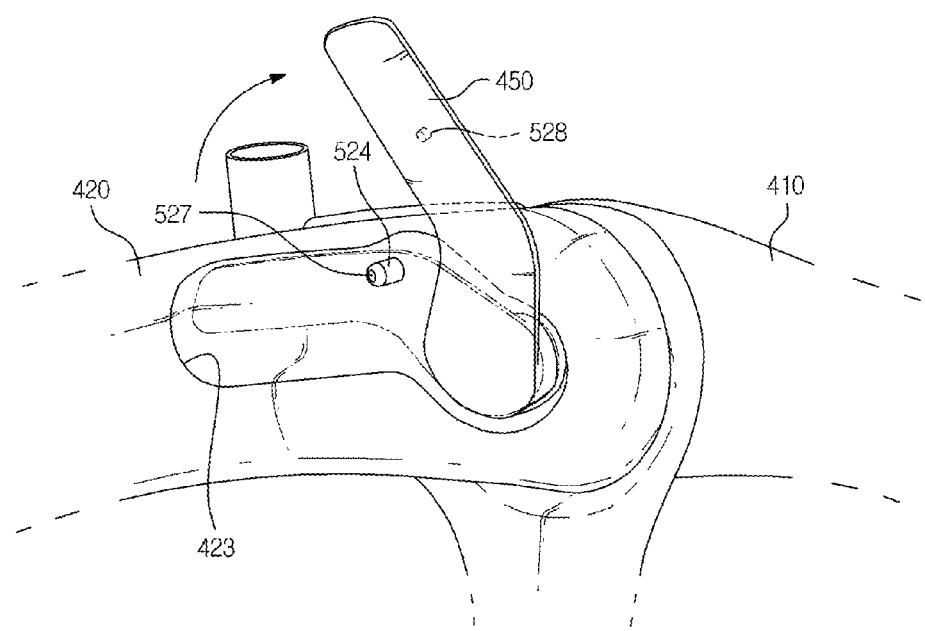
FIG. 4 is a view illustrating an actuation lever of the foldable electric bicycle according to the embodiment of the present invention.

FIG. 3 is an exploded perspective view illustrating the hinge-coupling portion of the foldable electric bicycle according to the embodiment of the present invention. FIG. 4 is a view illustrating an actuation lever of the foldable electric bicycle according to the embodiment of the present invention.

Referring to FIGS. 3 and 4, the hinge-coupling portion 400 includes the front hinge-coupling portion 410 provided at the end of the front frame 100, the rear hinge-coupling portion 420 provided at the end of the rear frame 300, and the center hinge-coupling portion 430 provided at the end of the center frame 200. The front hinge-coupling portion 410 and the rear hinge-coupling portion 420 are coupled to the left and the right of the center hinge-coupling portion 430.

Each of the hinge-coupling portions 410, 420, and 430 has an inclined angle θ of, for example, about 6 degrees relative to a straight line defined by the front wheel 10 and the rear wheel 50. This enables the front wheel 10 and the rear wheel 50 to be flush with each other in an unfolded state of the electric bicycle and enables the front wheel 10 and the rear wheel 50 to be located in parallel with each other in a folded state of the electric bicycle.

A hinge shaft 440 is arranged at centers of the hinge-coupling portions 410, 420, and 430. The hinge shaft 440 is fixedly coupled, at one end thereof, to the hinge-coupling portion 410 by a mount, passes, at a middle end thereof, through a center hub 432 provided at the center of the center hinge-coupling portion 430, and is coupled, at the other end thereof, to an actuation lever 450 by passing through the rear hinge-coupling portion 420.

The center hinge-coupling portion 430 includes a center rim 431 provided on an outer periphery thereof and a center hub 432 provided at the center thereof, in order to reduce weight thereof. The center rim 431 and the center hub 432 are connected by a plurality of ribs 433. The hinge shaft 440 passes through a hollow of the center hub 432.

The rear hinge-coupling portion 420 may include a rear rim 421 and a rear hub 422, similarly to the center hinge-coupling portion 430. The front hinge-coupling portion 410 may also include a front rim and a front hub. Although not shown in the drawings, each of the front rim and the front hub has the same shape as each of the rear rim 421 and the rear hub 422.

The actuation lever 450 is provided at the rear hinge-coupling portion 420 of the rear frame 300 so as to be rotatable about the hinge shaft 440, and may include a lever cover so that the end of the hinge shaft 440 is not visible.

Meanwhile, the hinge-coupling portion 400 may include metal rings 460 provided on rotational contact surfaces of the hinge-coupling portions 410, 420, and 430 facing each other such that the hinge-coupling portions 410, 420, and 430 may smoothly rotate, a gap member 470 to adjust a gap between each of the hinge-coupling portions 410, 420, and 430, and a rolling member 480 to allow the hinge-coupling portions 410, 420, and 430 to smoothly rotate.

The gap member 470 include a fixing cam 472 and a rotary cam 474 which are provided between the rear hinge-coupling portion 420 and the actuation lever 450.

The fixing came 472 is fixedly installed, at a rear surface thereof, to a square fixing hole 424 provided on the rear hub 422 of the rear hinge-coupling portion, and the rotary cam 474 is fixedly installed, at a rear surface thereof, to a square fixing hole 454 provided on the actuation lever 450.

Cam surfaces 473 and 475 are provided on front surfaces of the fixing came 472 and the rotary cam 474 facing each other, respectively.

The cam surfaces 473 and 475 are formed in a ridge shape and a dent shape, respectively. In a case of locking of the actuation lever 450, the cam surfaces 473 and 475 are spaced apart from each other, for example by about 2 mm while the ridges thereof come into contact with each other. In a case of unlocking of the actuation lever 450, the cam surfaces 473 and 475 are pressed against each other while the ridge and the dent thereof come into contact with each other. The hinge shaft 440 passes through the cams, regardless of cam surface operation of the fixing cam 472 and the rotary cam 474. In addition, the tip of the hinge shaft 440 passing through the actuation lever 450 is fixedly coupled to a nut 479 while washers 476 and a needle bearing 478 are interposed therebetween.

The rolling member 480 includes cylinders 482 inserted into mounting holes 435 of the center frame 200 and rollers 484 provided on both ends of an outer periphery of each cylinder 482.

The rollers 484 protrude from both surfaces of the center frame 200 so as to come into rolling contact with rim guides 425 which are respectively provided in the front rim and the rear rim 421 of the respective front hinge-coupling portion 410 and rear hinge-coupling portion 420.

Each rim guide 425 includes a plurality of rim protrusions 426 to limit a movement distance of the associated roller 484 in the left and right direction while supporting rolling of the roller 484. That is, the rim guide 425 having an arc shape and the rim protrusions 426 protruding from both ends of the rim guide 425 define a fan shape and the roller 484 moves within the fan shape, thereby allowing rotation distances of the frames 100 and 300 to be effectively limited.

In addition, the hinge-coupling portion 400 may further include a load distribution support portion in order to reduce a load which is repeatedly applied to the hinge shaft 440 by weight of the frames 100 and 300 during folding operation of the electric bicycle.

The load distribution support portion may include a ring mount 492 provided on the hinge shaft 440 between the center frame 200 and the rear frame 300 and a bearing 494 inserted into a hollow of the ring mount 492. The ring mount 492 is fixed to the rear hub 422 of the rear hinge-coupling portion 420, and the bearing 494 inserted into the ring mount 492 distributes and supports a load applied to the hinge shaft 440 at two spaced points together with a bearing 496 inserted into the center hub 432.

In addition, the hinge-coupling portion 400 includes a locking pin member 500 passing through each of the hinge-coupling portions 410, 420, and 430 such that the front frame 100, the center frame 200, and the rear frame 300 may be stably maintained in an unfolded state when the actuation lever 450 is locked.

The locking pin member 500 includes a center pin 510 provided at the center frame 200 and a rear pin 520 provided at the rear frame 300.

The center pin 510 is provided in the associated mounting hole 435 on the center rim 431 of the center hinge-coupling portion 430. The associated cylinder 482 of the rolling member 480 is installed to the mounting hole 435, and the center pin 510 is installed by inserting an elastic member 512 into the hollow of the cylinder 482. When external force is applied to the center pin 510 by the elastic member 512 in a state in which the center pin 510 is inside the center hinge-coupling portion 430, the center pin 510 protrudes toward the front hinge-coupling portion 410.

The rear pin 520 is provided in a mounting hole 429 on the rear rim 421 of the rear hinge-coupling portion 420 by inserting an elastic member 522 thereinto. The rear pin 520 is provided such that a head 524 protrudes outward of the rear hinge-coupling portion 420 by the elastic member 522. When external force is applied to the rear pin 520, the head 524 enters the rear hinge-coupling portion 420 while an opposite side thereof protrudes toward the center hinge-coupling portion 430.

The center pin 510 and the rear pin 520 are in a line in the unfolded state of the electric bicycle and are spaced apart from each other in the folded state of the electric bicycle.

Meanwhile, the actuation lever 450 is accommodated in a seating groove 423 of the rear hinge-coupling portion 420 in the case of the unfolded state of the electric bicycle (indicated by a dotted line in FIG. 4), whereas the actuation lever 450 is separated from the seating groove 423 of the rear hinge-coupling portion 420 in the case of the folded state of the electric bicycle (indicated by a solid line in FIG. 4).

In addition, the head 524 of the rear pin 520 may include a coupling groove 526 such that the actuation lever 450 and the locking pin member 500 are coupled at an accurate position of the seating groove 423 and the actuation lever 450 may include a coupling protrusion 528 corresponding to the coupling groove 526.

In order to fold the electric bicycle, a user rotates the actuation lever 450 about the hinge shaft 440. When the actuation lever 450 is separated from the seating groove 423 of the rear frame 300, the rear pin 520 of the locking pin member 500 retreats such that the head 524 is exposed by the elastic member 522. The rear pin 520 pushes the center pin 510 in a line. Therefore, when the rear pin 520 retreats, the center pin 510 also elastically retreats toward the actuation lever 450 by the elastic member 512.

The head 524 of the rear pin 520 is introduced into the mounting hole 429 by retreat of the rear hinge-coupling portion 420, with the consequence that locking between the rear hinge-coupling portion 420 and the center hinge-coupling portion 430 is released. Similarly, the center pin 510 is introduced into the cylinder 482 by retreat of the center pin 510, with the consequence that locking between the center hinge-coupling portion 430 and the front hinge-coupling portion 410 is released.

Figure 5:
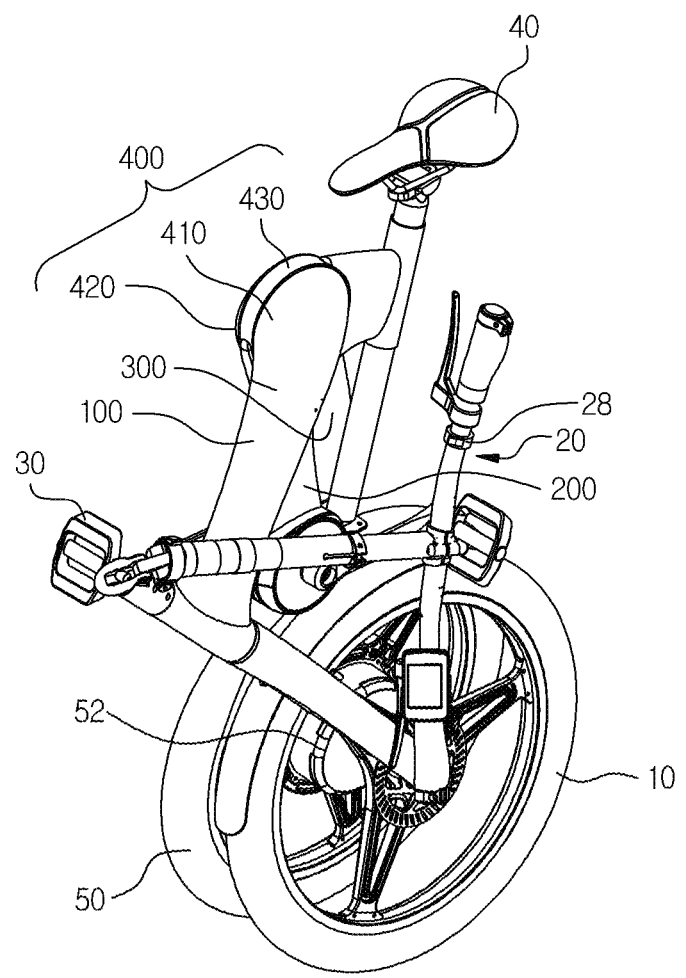
FIG. 5 is a perspective view illustrating a folded state of the foldable electric bicycle according to the embodiment of the present invention.

When the locking pin member 500 is released, a user may fold the electric bicycle by rotating the front frame 100 and the rear frame 300 about the hinge-coupling portion 400 of the center frame 200 from the left and the right (see FIG. 5). In this case, the handle stem 21 is folded toward the front wheel 10 by release of the clamp 21a. In the folded state of the electric bicycle, a user may easily move the electric bicycle to a desired position by gripping the saddle 40.

As described above, since a predetermined force or more is required when the front frame and the rear frame are folded about the center frame, the elderly and infirm or the women may be cumbersome or difficult in folding the electric bicycle.

Accordingly, in order to simply and easily fold the electric bicycle in the present embodiment, by actuating the wheel rotated by the drive motor among the wheels joined to the front frame and the rear frame at a limited speed when the electric bicycle is folded, the front frame and/or a rear frame may easily rotate without application of large force. Accordingly, the electric bicycle may be simply and easily folded even if the elderly and infirm or the women merely lift the center frame.

Figure 6:
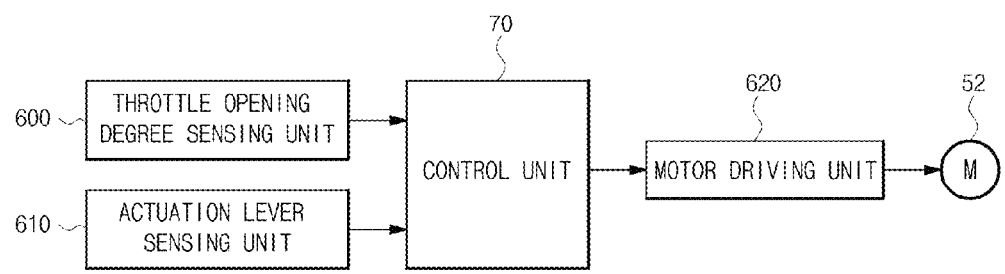
FIG. 6 is a control block diagram of the foldable electric bicycle according to the embodiment of the present invention.

FIG. 6 is a control block diagram of the foldable electric bicycle according to the embodiment of the present invention.

Referring to FIG. 6, the electric bicycle includes the control unit 70 to perform whole control thereof.

An input side of the control unit 70 is electrically connected with a throttle opening degree sensing unit 600 and an actuation lever sensing unit 610.

An output side of the control unit 70 is electrically connected with a motor driving unit 620.

The throttle opening degree sensing unit 600 senses a throttle opening degree of the throttle 28. If a user turns the throttle 28 for acceleration, the throttle opening degree sensing unit 600 senses a throttle opening degree depending upon a rotation level of the throttle 28. The throttle opening degree corresponds to an output of the drive motor 52.

The throttle opening degree sensing unit 600 may include a throttle position sensor provided within the throttle 28. The throttle position sensor is mounted to a throttle body and converts an opening degree of the throttle valve into an electrical signal. A signal indicative of the throttle opening degree sensed by the throttle opening degree sensing unit 600 is transmitted to the control unit 70.

The actuation lever sensing unit 610 senses whether the actuation lever 450 is at a locked position or at an unlocked position. In this case, the locked position refers to a position of the actuation lever to maintain the folded state of or the unfolded state of the electric bicycle and the unlocked position refers to a position of the actuation lever capable of folding the electric bicycle. For example, the actuation lever 450 being at the locked position means a state in which the hinge-coupling portions are locked such that rotation between the front frame 100 and the center frame 200 and rotation between the center frame 200 and the rear frame 300 are locked. In addition, the actuation lever 450 being at the unlocked position means a state in which the hinge-coupling portions are unlocked such that rotation between the front frame 100 and the center frame 200 and rotation between the center frame 200 and the rear frame 300 are possible.

When the actuation lever 450 is shifted to the unlocked position by a user, the locking pin member 500 retreats, and thus the front hinge-coupling portion 410 and the center hinge-coupling portion 430 are unlocked and the rear hinge-coupling portion 420 and the center hinge-coupling portion 430 are unlocked. In addition, when the actuation lever 450 is shifted to the locked position by a user, the locking pin member 500 is returned to an original position, and thus the front hinge-coupling portion 410 and the center hinge-coupling portion 430 are locked and the rear hinge-coupling portion 420 and the center hinge-coupling portion 430 are locked.

The motor driving unit 620 regulates a rotation speed of the drive motor 52. The motor driving unit 620 regulates a rotation speed of the drive motor 52 by changing the number of poles of the drive motor 52 or varying frequency of power supplied to the drive motor 52.

When the actuation lever 450 is sensed as being at the unlocked position by the actuation lever sensing unit 610 and a change in throttle opening degree is sensed by the throttle opening degree sensing unit 600, the control unit 70 allows the drive motor 52 to be driven by the motor driving unit 620.

Figure 7:
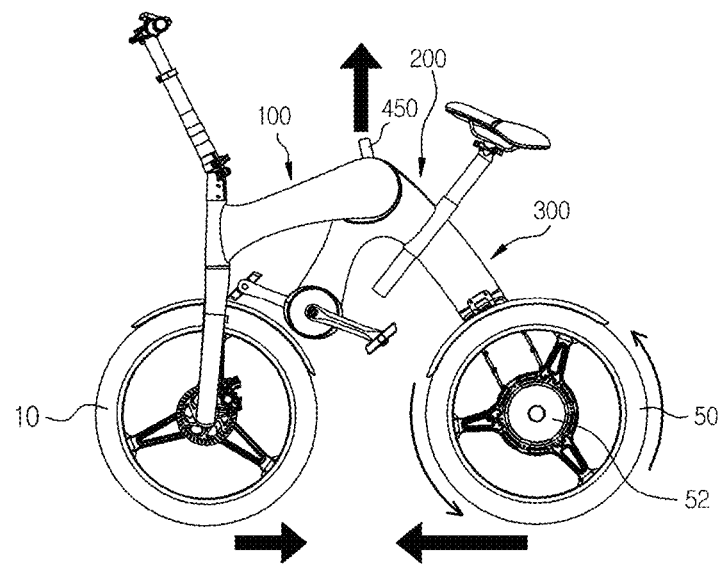
FIG. 7 is a view for explanation of operation of folding the electric bicycle according to the embodiment of the present invention.
Figure 7:
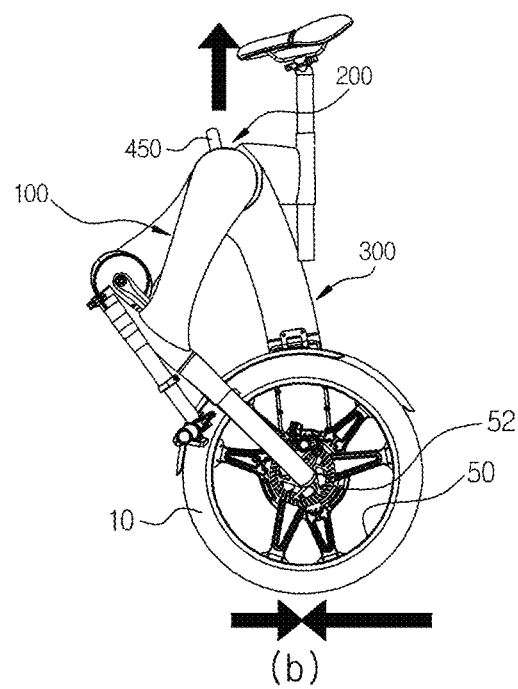

For example, when the actuation lever 450 is shifted from the locked position to the unlocked position by a user, the locking pin member 500 retreats, and thus the front hinge-coupling portion 410 and the center hinge-coupling portion 430 are unlocked and the rear hinge-coupling portion 420 and the center hinge-coupling portion 430 are unlocked. Consequently, the front frame 100 and the rear frame 300 are rotatable about the center frame 200. In this state, when the drive motor 52 of the rear wheel 50 is driven, the wheel advances toward the center of the electric bicycle (or the front wheel 10) by the drive motor 52 so that the advance of the wheel (see an arrow indicated at the wheel side in FIG. 7) may help the rear frame 300 to rotate. That is, since this enables torque between the front frame 100 and the center frame 200 and torque between the center frame 200 and the rear frame 300 to be generated, the electric bicycle may be simply and easily folded when a user lightly lifts the center frame (see an arrow indicated at the center frame side in FIG. 7) without application of large force (see FIGS. 7A and 7B).

Meanwhile, when the actuation lever 450 is sensed as being shifted to the unlocked position by the actuation lever sensing unit 610 and a change in throttle opening degree is sensed by the throttle opening degree sensing unit 600, the control unit 70 allows the drive motor 52 to be driven at a preset speed so as to be slower than a normal driving speed when the drive motor 52 is driven. This enables the electric bicycle to be prevented from being suddenly ejected forward due to a very high speed because it is sufficient if the rear wheel 50 may slowly advance toward the center of the electrical bicycle or toward the front wheel 10 to help rotation of the rear frame 300 by the weight thereof. In this case, the control unit 70 may also allow the drive motor 52 to be driven at a normal driving speed instead of a preset speed.

To this end, when the actuation lever 450 is sensed as being shifted to the unlocked position by the actuation lever sensing unit 610 and a change in throttle opening degree is sensed by the throttle opening degree sensing unit 600, the control unit 70 allows a motor speed of the drive motor 52 to be limited to a preset speed so as to drive the drive motor 52 at the limited speed by the motor driving unit 620. In this case, the preset speed is a speed set slower than the normal driving speed of the drive motor 52 when the actuation lever 450 is shifted to the locked position. That is, the preset speed is a low speed of the motor which may help a user to fold the electric bicycle.

Figure 8:
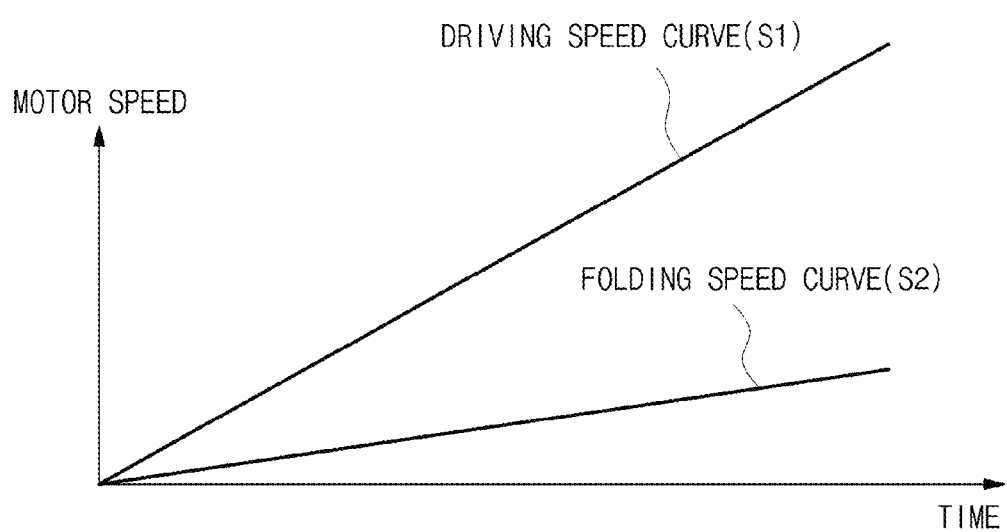
FIG. 8 is a graph for explanation of speed of a wheel rotated by a drive motor when folding the foldable electric bicycle according to the embodiment of the present invention.

FIG. 8 is a graph for explanation of speed of the wheel rotated by the drive motor when folding the foldable electric bicycle according to the embodiment of the present invention.

In the graph of FIG. 8, the horizontal axis refers to time and the vertical axis refers to motor speed.

A driving speed curve S1 refers to a motor speed curve when the throttle 28 operates in a state in which the actuation lever 450 is shifted to the locked position. That is, the driving speed curve S1 refers to a motor speed curve during normal driving of the electric bicycle.

A folding speed curve S2 refers to a motor speed curve when the throttle 28 operates in a state in which the actuation lever 450 is shifted to the unlocked position. That is, the folding speed curve S2 refers to a motor speed curve for folding of the electric bicycle.

It may be seen that the folding speed curve S2 has a slower speed and a lower velocity gradient than the driving speed curve S1. Accordingly, the motor speed of the drive motor 52 is limited to a preset speed such that the rear wheel 50 slowly advances only at a level to help rotation of the rear frame 300 by weight thereof and is prevented from being suddenly ejected forward. If necessary, it may limit the velocity gradient.

Figure 9:
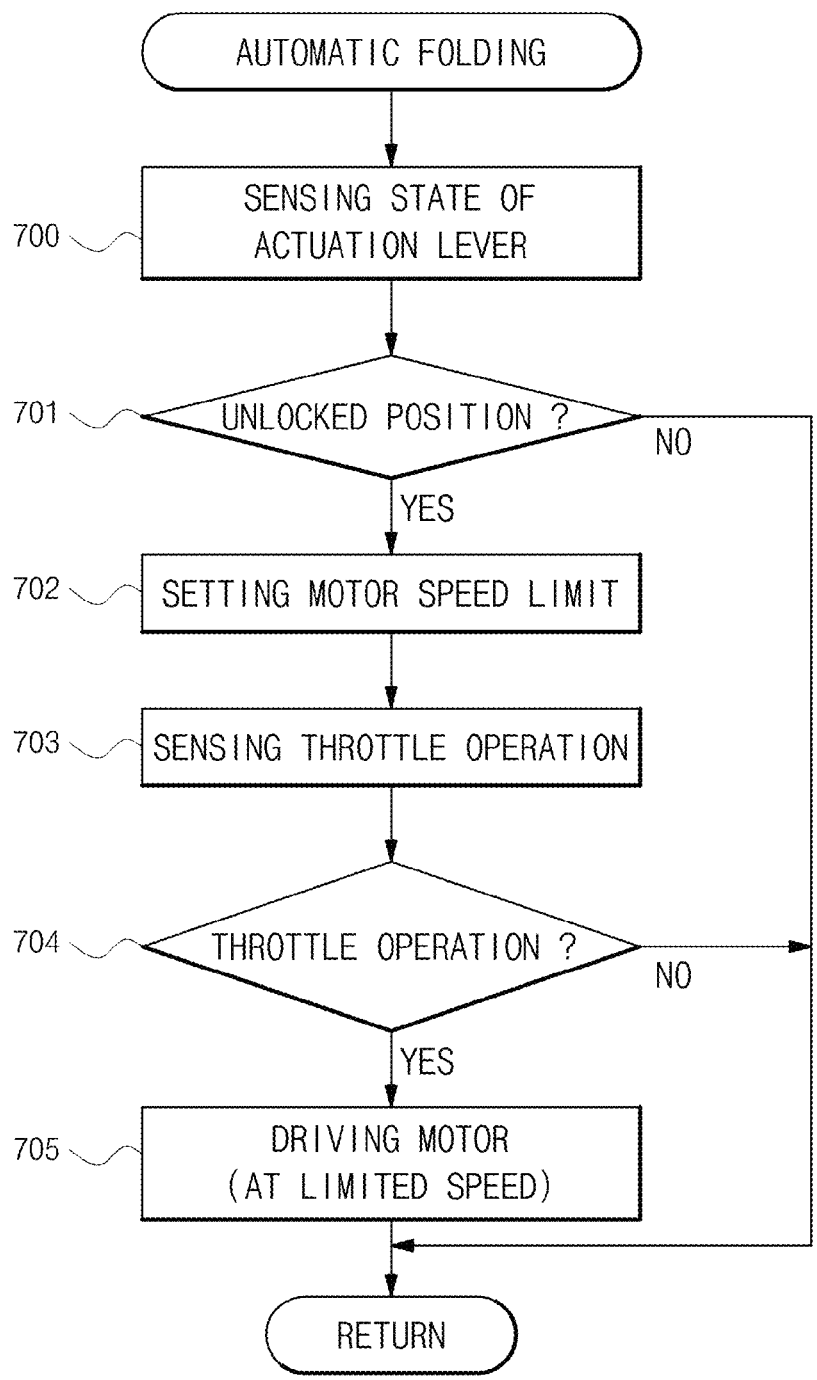
FIG. 9 is a control flowchart for explanation of operation of folding the foldable electric bicycle according to the embodiment of the present invention.

FIG. 9 is a control flowchart for explanation of operation of folding the electric bicycle according to the embodiment of the present invention.

Referring to FIG. 9, in automatic folding operation to fold the electric bicycle, the control unit 70 first allows a state of the actuation lever 450 to be sensed by the actuation lever sensing unit 610 in order to sense whether the actuation lever 450 is at the locked position or at the unlocked position (operation mode 700).

At operation mode 701 subsequent to operation mode 700, the control unit 70 determines whether or not the actuation lever 450 is at the unlocked position based on the sensed result of the actuation lever 450 (operation mode 701).

When the actuation lever 450 is at the unlocked position as a result of the determination of operation mode 701, the control unit 70 sets a motor speed limit such that the motor speed of the drive motor 52 is limited to a preset speed at operation mode 702 next operation mode 701 (operation mode 702). In this case, the preset speed is a speed set slower than the normal driving speed of the drive motor 52 when the actuation lever 450 is shifted to the locked position. That is, the preset speed is a low speed of the motor which may help a user to fold the electric bicycle.

After setting the motor speed limit, the control unit 70 allows a throttle opening degree to be sensed by the throttle opening degree sensing unit 600 (operation mode 703).

After the throttle opening degree is sensed at operation mode 703, the control unit 70 determines whether or not the throttle 28 is operated by a user based on a change of the sensed throttle opening degree (operation mode 704).

When the throttle 28 is operated as a result of the determination of operation mode 704, the control unit 70 allows the drive motor 52 to be driven at a preset speed as a limited speed by the motor driving unit 620 at operation mode 705 subsequent to operation mode 704 (operation mode 705). The automatic folding to fold the electric bicycle is achieved by the above-mentioned series of operations. Thus, since torque of the rear frame 300 in the rotation direction by weight thereof is increased by the rear wheel 50 advancing toward the front wheel 10, the electric bicycle may be conveniently and easily folded when a user lightly lifts the center frame using small force.

Meanwhile, even if the electric bicycle is folded, large force is required to move or transport the folded electric bicycle.

Hereinafter, a description will be given of easy movement or transportation of the folded electric bicycle.

Figure 10:
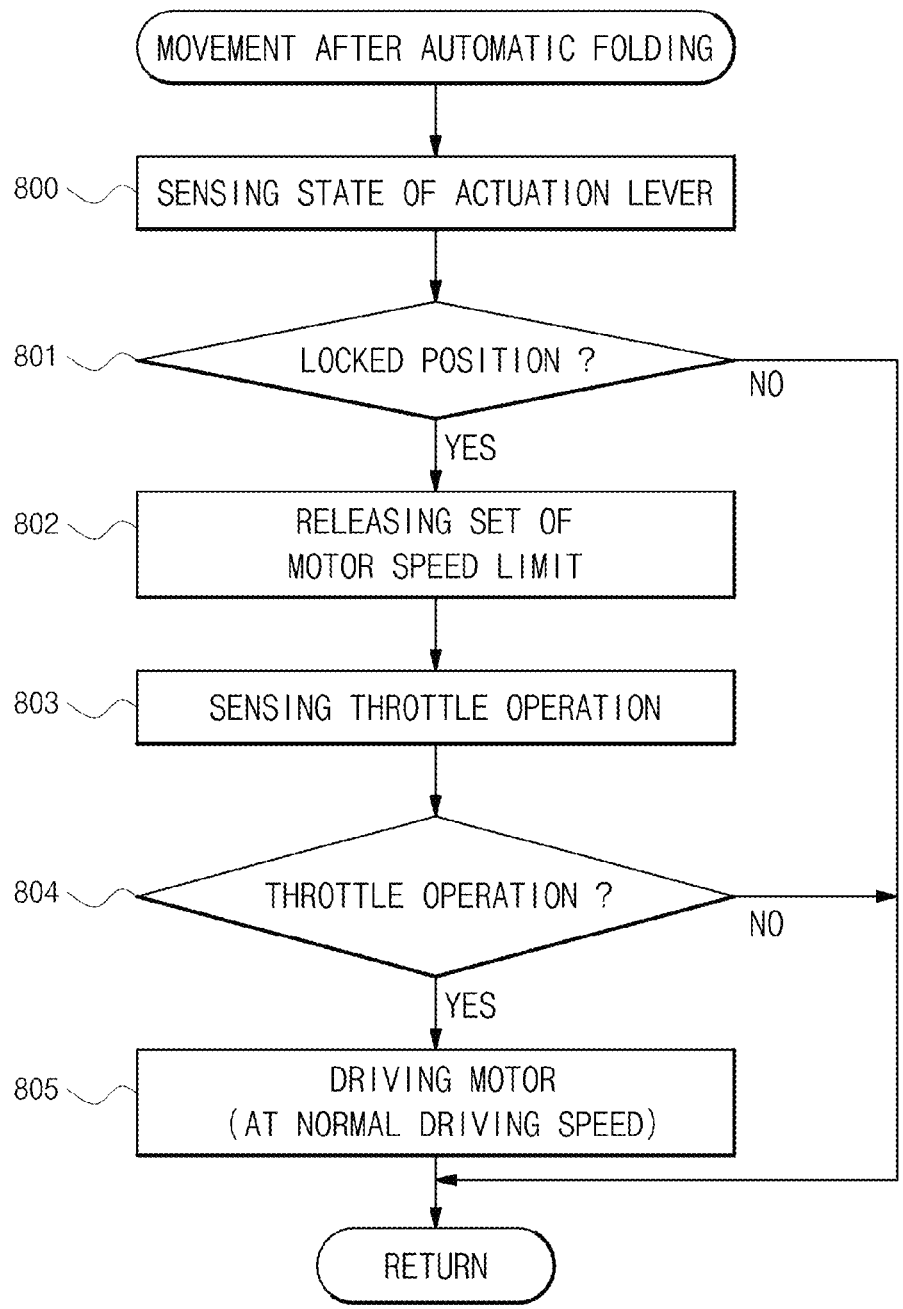
FIG. 10 is a control flowchart for explanation of movement of the foldable electric bicycle according to the embodiment of the present invention in a folded state thereof.

FIG. 10 is a control flowchart for explanation of movement of the foldable electric bicycle according to the embodiment of the present invention in the folded state thereof.

Referring to FIG. 10, in movement operation after the automatic folding to move the folded electric bicycle, the control unit 70 first allows a state of the actuation lever 450 to be sensed by the actuation lever sensing unit 610 in order to sense whether the actuation lever 450 is at the locked position or at the unlocked position (operation mode 800).

At operation mode 801, the control unit 70 determines whether or not the actuation lever 450 is at the locked position based on the sensed result of the actuation lever 450 (operation mode 801).

When the actuation lever 450 is at the locked position as a result of the determination of operation mode 801, the control unit 70 performs a setting to release a motor speed limit of the drive motor 52 limited to a preset speed at operation mode 802 (operation mode 802). In this case, the motor speed limit is released, and thus the drive motor 52 is driven at a normal driving speed instead of the preset speed during driving thereof.

After performing the setting to release the motor speed limit, the control unit 70 allows a throttle opening degree to be sensed by the throttle opening degree sensing unit 600 (operation mode 803).

After the throttle opening degree is sensed at operation mode 803, the control unit 70 determines whether or not the throttle 28 is operated by a user based on a change of the sensed throttle opening degree (operation mode 804).

When the throttle 28 is operated as a result of the determination of operation mode 804, the control unit 70 allows the drive motor 52 to be driven at a normal driving speed by the motor driving unit 620 at operation mode 805. The movement of the electric bicycle is achieved by the above-mentioned series of operations. Thus, the electric bicycle may be easily and conveniently moved to a desired place when a user operates the throttle 28 using small force in a state of gripping the folded electric bicycle.

Since the throttle 28 is typically provided at the handle portion 20, it may be difficult to operate the throttle 28 while keeping balance of the folded electric bicycle.

Hereinafter, a description will be given of an electric bicycle to which a wireless throttle is applied.

Figure 11:
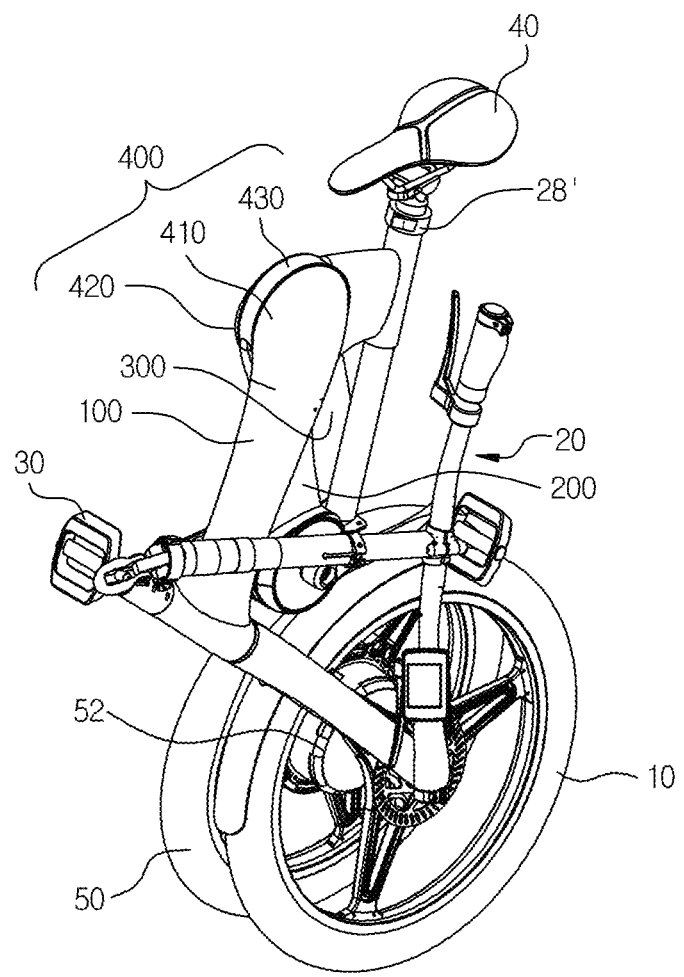
FIG. 11 is a view for explanation of application of a wireless throttle to a foldable electric bicycle according to another embodiment of the present invention.

FIG. 11 is a view for explanation of application of a wireless throttle to an electric bicycle according to another embodiment of the present invention.

Referring to FIG. 11, the throttle 28 of the electric bicycle may be replaced with a wireless throttle 28'.

In this case, when the wireless throttle 28' is used by installing the same to the handle portion 20 at the ordinary time and is decoupled from the handle portion 20 so as to be installed to the saddle rod 43 beneath the saddle 40 when the electric bicycle is moved, a user may operate the wireless throttle 28' installed to the saddle rod 43 using one's hand gripping the saddle rod 43 while moving the folded electric bicycle in a state of gripping the saddle rod 43. Consequently, the folded electric bicycle may be further easily and conveniently moved.

Hereinafter, a description will be given of a configuration of the electric bicycle to realize the wireless throttle 28'.

Figure 12:
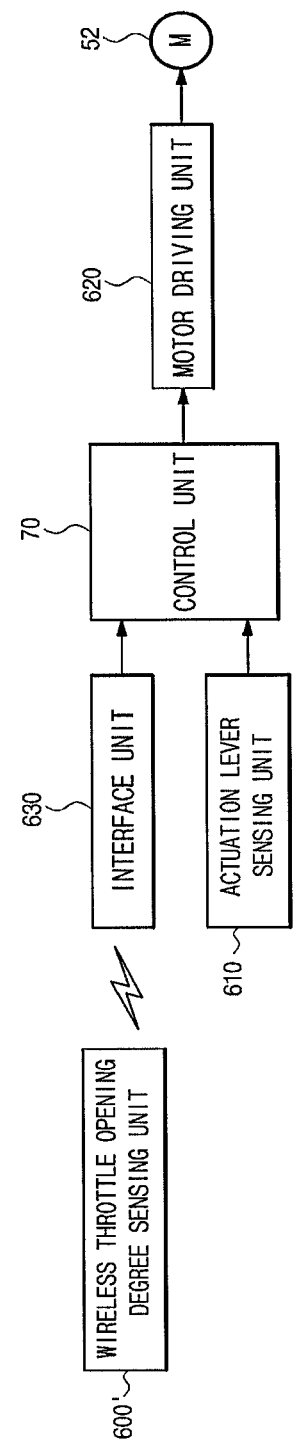
FIG. 12 is a control block diagram of the foldable electric bicycle according to another embodiment of the present invention.

FIG. 12 is a control block diagram of the foldable electric bicycle according to another embodiment of the present invention.

Referring to FIG. 12, the electric bicycle includes a wireless throttle opening degree sensing unit 600' with which the throttle opening degree sensing unit 600 is replaced in a wireless form, and an interface unit 630 which transmits a throttle opening degree sensed by the wireless throttle opening degree sensing unit 600' through communication with the wireless throttle opening degree sensing unit 600' to the control unit 70.

The control unit 70 allows the drive motor 52 to be driven based on a change in throttle opening degree sensed by the wireless throttle opening degree sensing unit 600' via the interface unit 630, thereby enabling the folded electric bicycle to be easily moved.

Although the above embodiments have been described with respect to generation of torque between the front frame 100 and the rear frame 300 due to movement of the wheel by driving the drive motor 52 only when a user operates the throttles 28 and 28' in a state in which the actuation lever 450 is shifted from the locked position to the unlocked position, the present invention is not limited thereto. For example, when the actuation lever 450 is shifted from the locked position to the unlocked position without operation of the throttles 28 and 28' by a user, the drive motor 52 may also be stopped after being driven for a preset time.

As is apparent from the above description, since a wheel rotated by a drive motor among wheels joined to a front frame and a rear frame is actuated at a limited speed when an electric bicycle is folded, the front frame and/or a rear frame may easily rotate without application of large force. Accordingly, the electric bicycle may be simply and easily folded even if the elderly and infirm or the women merely lift a center frame.

In addition, since a speed-limited wheel is released from a speed limit when the electric bicycle is folded, the folded electric bicycle may be regulated as the same speed as driving by allowing a rider to adjust a throttle. Thus, the folded electric bicycle may be conveniently moved and transported.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A foldable electric bicycle comprising a drive motor to rotate at least one of a front wheel and a rear wheel, and an actuation lever to lock or unlock rotation between a front frame provided with the front wheel and a rear frame provided with the rear wheel by shifting the actuation lever so as to fold the electric bicycle or maintain a folded state or an unfolded state of the electric bicycle, the foldable electric bicycle comprising:

an actuation lever sensing unit to sense whether the actuation lever is at a locked position in which the rotation between the front frame and the rear frame is locked or at an unlocked position in which the rotation between the front frame and the rear frame is unlocked;
a motor driving unit to drive the drive motor;
a control unit which controls the motor driving unit to drive the drive motor in order to generate torque between the front frame and the rear frame by movement of the wheels when a position of the actuation lever is sensed by the actuation lever sensing unit and the actuation lever is shifted from the locked position to the unlocked position; and
a throttle opening degree sensing unit configured to sense an opening degree of a throttle to accelerate the foldable electric bicycle,
wherein the control unit is configured to control the motor driving unit to drive the drive motor in response to the opening degree of the throttle, sensed by the throttle opening degree sensing unit, in folding operation or the folded state of the electric bicycle.

2. The foldable electric bicycle according to claim 1, wherein the control unit allows the drive motor to be driven at a preset speed by the motor driving unit so as to be slower than a normal driving speed.

3. The foldable electric bicycle according to claim 2, wherein the normal driving speed is a motor speed to drive the drive motor when the actuation lever is at the locked position and the throttle opening degree is changed.

4. The foldable electric bicycle according to claim 3, wherein the control unit allows the drive motor to be driven at the normal driving speed changed from the preset speed when the actuation lever sensed by the actuation lever sensing unit is shifted from the unlocked position to the locked position and the throttle opening degree sensed by the throttle opening degree sensing unit is changed.

5. The foldable electric bicycle according to claim 1, wherein the control unit allows the drive motor to be driven at a speed corresponding to a change in throttle opening degree sensed by the throttle opening degree sensing unit.

6. The foldable electric bicycle according to claim 1, wherein the control unit controls the motor driving unit to drive the drive motor for a preset time.

7. The foldable electric bicycle according to claim 1, wherein the control unit controls the motor driving unit to drive the drive motor in order to move a folded electric bicycle when the actuation lever sensed by the actuation lever sensing unit is shifted from the unlocked position to the locked position and a throttle opening degree sensed by a throttle opening degree sensing unit is changed.

8. The foldable electric bicycle according to claim 1, wherein the drive motor is provided in the rear wheel to rotate the rear wheel.

9. A method of controlling a foldable electric bicycle comprising a drive motor to rotate at least one of a front wheel and a rear wheel, and an actuation lever to lock or unlock rotation between a front frame provided with the front wheel and a rear frame provided with the rear wheel by shifting the actuation lever so as to fold the electric bicycle or maintain a folded state or an unfolded state of the electric bicycle, the method comprising:
sensing whether the actuation lever is at a locked position in which the rotation between the front frame and the rear frame is locked or at an unlocked position in which the rotation between the front frame and the rear frame is unlocked;
driving the drive motor in order to generate torque between the front frame and the rear frame by movement of the wheels when the actuation lever is shifted from the locked position to the unlocked position;
sensing an opening degree of a throttle to accelerate the foldable electric bicycle when the actuation lever is shifted from the locked position to the unlocked position; and
driving the drive motor in response to the sensed opening degree of the throttle in folding operation or the folded state of the electric bicycle.

10. The method according to claim 9, wherein the drive motor is driven to move a folded electric bicycle when the sensed throttle opening degree is changed.

11. The method according to claim 10, wherein the drive motor is driven at a preset speed so as to be slower than a normal driving speed.

12. The method according to claim 11, wherein the normal driving speed is a motor speed to drive the drive motor when the actuation lever is at the locked position and the throttle opening degree is changed.

13. The method according to claim 12, wherein the drive motor is driven at the normal driving speed changed from the preset speed when the actuation lever is shifted from the unlocked position to the locked position and the sensed throttle opening degree is changed.

14. The method according to claim 10, wherein the drive motor is driven at a speed corresponding to a change of the sensed throttle opening degree.

15. The method according to claim 9, wherein the drive motor is driven for a preset time.

16. The method according to claim 9, wherein the drive motor is driven to move a folded electric bicycle when the actuation lever is shifted from the unlocked position to the locked position and a sensed throttle opening degree is changed.

17. A foldable electric bicycle comprising:
a front frame provided with a front wheel and a handle of the foldable electric bicycle;
a center frame provided with a pedal and a saddle;
a rear frame provided with a rear wheel;
a hinge-coupling portion allowing the front frame and the rear frame to be rotated and folded about the center frame, the hinge-coupling portion provided at a center thereof with a hinge shaft rotatably coupling the front frame, the center frame and the rear frame to each other, an actuation lever provided at one end of the hinge shaft and having a coupling protrusion, a locking pin member provided with a coupling groove corresponding to the coupling protrusion of the actuation lever, spaced apart from the hinge shaft while passing through the front frame, the center frame, and the rear frame so as to allow the front frame, the rear frame and the center frame to be rotated or the rotation to be locked by being moved according to rotation of the actuation lever;
an actuation lever sensing unit to sense whether the actuation lever is at a locked position in which the rotation between the front frame and the center frame and the rotation between the center frame and the rear frame are locked or at an unlocked position in which the rotation between the front frame and the center frame and the rotation between the center frame and the rear frame are allowed;
a motor driving unit to drive a drive motor that rotates the rear wheel;
a throttle opening degree sensing unit to sense an opening degree of a throttle to accelerate the foldable electric bicycle; and
a control unit configured to, at the time of folding the foldable electric bicycle, when the actuation lever is sensed as being shifted to the unlocked position by the actuation lever sensing unit and a change in throttle opening degree is sensed by the throttle opening degree sensing unit, allow the drive motor to be driven through the motor driving unit such that the rear wheel advances toward the front wheel such that the foldable electric bicycle is folded by torque generated with respect to the center frame by weights of the front frame and the rear frame according to a motion of the center frame being lifted plus torque generated by the rear wheel advancing toward the front wheel and increasing torque in a rotation direction by weight of the rear frame.

18. A foldable electric bicycle comprising:

a front frame provided with a front wheel and a handle of the foldable electric bicycle;

a center frame provided with a pedal and a saddle;

a rear frame provided with a rear wheel;

a hinge-coupling portion allowing the front frame and the rear frame to be rotated and folded about the center frame, the hinge-coupling portion provided at a center thereof with a hinge shaft rotatably coupling the front frame, the center frame and the rear frame to each other, an actuation lever provided at one end of the hinge shaft and having a coupling protrusion, a locking pin member provided with a coupling groove corresponding to the coupling protrusion of the actuation lever, spaced apart from the hinge shaft while passing through the front frame, the center frame, and the rear frame so as to allow the front frame, the rear frame and the center frame to be rotated or the rotation to be locked by being moved according to rotation of the actuation lever;

an actuation lever sensing unit to sense whether the actuation lever is at a locked position in which the rotation between the front frame and the center frame and the rotation between the center frame and the rear frame are locked or at an unlocked position in which the rotation between the front frame and the center frame and the rotation between the center frame and the rear frame are allowed;

a motor driving unit to drive a drive motor that rotates the rear wheel;

a throttle opening degree sensing unit to sense an opening degree of a throttle to accelerate the foldable electric bicycle; and a control unit configured to, at the time of folding the foldable electric bicycle, when the actuation lever is sensed as being shifted to the unlocked position by the actuation lever sensing unit and a change in throttle opening degree is sensed by the throttle opening degree sensing unit, allow the drive motor to be driven at a preset speed slower than a normal driving speed through the motor driving unit such that the rear wheel advances toward the front wheel such that the foldable electric bicycle is folded by torque generated with respect to the center frame by weights of the front frame and the rear frame according to motion of the center frame being lifted plus torque generated by the rear wheel advancing toward the front wheel and increasing torque in a rotation direction by weight of the rear frame, and during folding of the foldable electric bicycle, when the actuation lever is sensed as being shifted to the locked position by the actuation lever sensing unit and a change in throttle opening degree is sensed by the throttle opening degree sensing unit, configured to change a speed of the drive motor from a normal driving speed to the preset speed through the motor driving unit such that the foldable electric bicycle is moved using small force according to operation of the throttle.

* * * * *